United States Patent
Li

(10) Patent No.: US 8,428,206 B2
(45) Date of Patent: Apr. 23, 2013

(54) LOW COMPLEXITY FINE TIMING SYNCHRONIZATION METHOD AND SYSTEM FOR STIMI

(75) Inventor: Yan Li, Shanghai (CN)

(73) Assignee: NXP B.V., Eindhoven (NL)

( * ) Notice: Subject to any disclaimer, the term of this patent is extended or adjusted under 35 U.S.C. 154(b) by 348 days.

(21) Appl. No.: 12/920,716

(22) PCT Filed: Mar. 5, 2009

(86) PCT No.: PCT/IB2009/050918
§ 371 (c)(1),
(2), (4) Date: Sep. 2, 2010

(87) PCT Pub. No.: WO2009/109938
PCT Pub. Date: Sep. 11, 2009

(65) Prior Publication Data
US 2011/0013687 A1    Jan. 20, 2011

Related U.S. Application Data

(60) Provisional application No. 61/068,349, filed on Mar. 5, 2008.

(51) Int. Cl.
*H04L 7/00* (2006.01)
(52) U.S. Cl.
USPC ........... 375/354; 375/226; 375/229; 375/260; 375/316; 375/326; 375/340; 375/342; 375/344; 375/350; 375/362; 375/371; 455/75; 455/119; 455/173.1; 455/182.1; 455/182.2; 455/192.1; 455/192.2; 455/502; 455/516; 370/210; 370/480; 370/503; 370/508; 370/509; 370/510; 370/511; 370/512; 370/513; 370/514; 370/516; 327/141; 714/707
(58) Field of Classification Search .................. 375/226, 375/229, 260, 316, 326, 340, 342, 343, 344, 375/350, 354, 362, 371; 455/75, 119, 173.1, 455/182.1, 182.2, 192.1, 192.2, 502, 516; 370/210, 480, 503, 508, 509, 510, 511, 512, 370/513, 514, 516; 327/141; 714/707
See application file for complete search history.

(56) References Cited

U.S. PATENT DOCUMENTS
6,885,693 B1 * 4/2005 Burton .......................... 375/142
2003/0081695 A1   5/2003 Eilts et al.

FOREIGN PATENT DOCUMENTS
EP    2 071 787 A1    6/2009

OTHER PUBLICATIONS

Hsieh, Meng-Han, et al; "A Low Complexity Frame Synchronization and Frequency Offset Compensation Scheme for OFDM Systems Over Fading Channels"; IEEE Transactions on Vehicular Technology, Vol. 48, No. 5; 14 pages (September 1999).
Park, Kyung Won, et al; "A Detection Method for an OFDM Signal Distored by IQ Imbalance"; IEEE 16H Intl Symp on Personal, Indoor, and Mobile Radio Communications; 4 pages (2005).

(Continued)

Primary Examiner — Leon Flores

(57) ABSTRACT

A method and system of fine timing synchronization for an OFDM signal. The OFDM signal is coarse timing synchronized, generating a synchronization sequence and a CFR (Channel Frequency Response). The synchronization sequence is removed. A correlation coefficient of the correlation between the CFR applied to a number of carriers and the number of carriers with different window shifts is calculated. The largest window shift corresponding to a downsampling factor is indicated by the lowest correlation coefficient greater than a threshold. The CFR is downsampled by the downsampling factor, and an inverse FFT is performed on the downsampled CFR with a reduced number of calculations reduced by the downsampling factor, transforming the CFR into a CIR. A fine timing synchronization position is determined from the CIR and is utilized by an FFT unit within an OFDM receiver to accurately receive OFDM symbols of the OFDM signal. Application to Satellite Terrestrial interactive Multi-service Infrastructure (STiMi)

12 Claims, 4 Drawing Sheets

OTHER PUBLICATIONS

Ramasubramanian, et al; "An OFDM Timing Recovery Scheme With Inherent Delay-Spread Estimation"; IEEE; 6 pages (2001).

International Search Report for Application PCT/IB2009/050918 (March 5, 2009).

* cited by examiner

LOW COMPLEXITY FINE TIMING SYNCHRONIZATION METHOD AND SYSTEM FOR STIMI

The present invention relates to a low complexity fine timing synchronization method and system for Satellite Terrestrial Interactive Multi-service Infrastructure (STiMi).

Satellite Terrestrial Interactive Multi-service Infrastructure (STiMi) is a mobile multimedia broadcasting trade standard that was developed and released by the Chinese State Administration of Radio Film and Television (SARFT). This standard is applicable to all broadcasting systems that transmit multimedia signals such as in television, radio and data information wirelessly through satellites and/or ground. In the physical layer, STiMi uses Orthogonal Frequency Division Multiplexing (OFDM) as its air interface. OFDM is capable of providing high rate transmissions.

FIG. 1 is an illustration of the time slot structure of STiMi (8 MHz mode). Two identical synchronization symbols are inserted between every time slot. FIG. 1 shows the time slot structure of STiMi (8 MHz mode). Two identical synchronization symbols are inserted in between every time slot. The sampling rate is 10 MHz. The Fast Fourier Transform (FFT) size for the synchronization symbols and the OFDM symbols are 2048 and 4096, respectively. The two synchronization symbols are a known pseudo-noise (PN) sequence in the frequency domain. The cyclic prefix (CP) length for each OFDM symbol is 512. In OFDM, the CP is a repeat of the end of the previous symbol at the beginning of the current symbol. In between two consecutive OFDM symbols, a windowing cosine shape time waveform is inserted as a guard interval (GI) to reduce adjacent sub-carrier interference and make the transmitted spectrum more compact. There is no GI between the two identical synchronization symbols, nor is there a CP for the synchronization symbols.

Acquisition is the initial step in the synchronization process. Acquisition includes a timing synchronization and frequency synchronization. The timing synchronization includes a coarse timing synchronization and a fine timing synchronization. The fine timing synchronization provides an estimate of the CP position in the received samples.

STiMi has adopted a transmission mode that is a combination of continuous mode and burst mode, as shown in FIG. 1. The series of OFDM symbols is a continuous mode transmission. The Transmit Identification (TxID) and the two synchronization (SYNC) symbols break up the continuous mode transmission with burst mode transmissions. Rather than using the CP for correlation, which provides multiple windows averaging for improvements of performance, STiMi calculates the correlation between the first SYNC symbol and the second SYNC symbol. FIG. 2 is a conventional flow diagram of the STiMi acquisition signal flow.

At block 210, time slot detection is performed using the two SYNC symbols of the OFDM signal. Since the first SYNC symbol and the second SYNC symbol should be identical, the correlation is indicative of adjustments needed to be made to the carrier frequency in order to properly receive the OFDM symbols. The window of the correlator is set to 2048, the length of each SYNC symbol. Once the correlation output is higher than a preset threshold, the coarse synchronization position is found.

At block 220, the OFDM samples are transferred to the frequency domain using the FFT. At block 230, frequency offset compensation is performed on the carrier signal. As the final step in the coarse timing synchronization, the frequency domain signal is used to calculate a frequency offset estimation. Since the two SYNC symbols are the same, the sequence used for the FFT is a cyclic replica of the received SYNC symbols. In theory, the FFT window positions are determined by the correlation output. However, in multi-path and noise environment, there is a disparity between ideal position and real position. Accordingly, STiMi uses the following fine time synchronization module shown in FIG. 2 to estimate an accurate time offset.

As mentioned above, fine time synchronization is performed for reception of the OFDM symbols. It includes three steps: equalization, Inverse Fast Fourier Transform (IFFT) and a fine time window search. The signal input into the fine time synchronization module is:

$$R(k) = H(k) \cdot S(k) \cdot e^{j2\pi \frac{k}{N_{SYN}} \tau_s} + n(k),$$

where H(k) is the channel frequency response (CFR), S(k) denotes synchronization symbols in STiMi and n(k) is the noise. Since the sequence used for the FFT was a cyclic replica of the received synchronization symbol with offset $$e^{j2\pi \frac{k}{N_{SYN}} \tau_s} \tau_s,$$

the sequence adds a linear phase in the frequency domain.

At block 240 of FIG. 2, the synchronization sequence generated during the coarse timing synchronization by performing the FFT of the synchronization symbols is removed from the signal. The equalization step removes the training sequence using one-tap equalizer $$\hat{H}(k) = \frac{R(k)}{S(k)} = H(k) \cdot e^{j2\pi \frac{k}{N_{SYN}} \tau_s} + n'(k)$$

At block 250, the IFFT of the CFR is performed. The resulting estimated CFR is transformed to the time domain by the IFFT, illustrated by the following equation, $$\{\hat{H}(k) = H(l)e^{j2\pi \frac{k}{N_{SYN}} \tau_s}\} \xrightarrow{IFFT} \{h(t) * \delta(t - \tau_\varepsilon T_{sam})\},$$

where $T_{sam}$ is the sample interval. The resulting channel impulse response (CIR) is effectively offset by the same amount as the FFT window offset.

At block 260, the fine time position synchronization is determined. Estimating an accurate time offset $\tau_s$ may be based on the channel power delay profile. The fine time position synchronization is output to an FFT unit of an OFDM receiver to accurately receive the OFDM symbols of the OFDM signal.

The estimated CIR is obtained by applying an IFFT to the CFR, as shown in the equation above. The operation of an N-point IFFT requires calculations. The $N*\log_2^N$ STiMi system uses 2048 points. An FFT operation is a high complexity operation for a receiver, especially for mobile terminals (such as mobile phones). Computational complexity results in high power consumption and cost for a mobile terminal.

In conventional OFDM systems, the channel coherence bandwidth is smaller than the OFDM system bandwidth. In other words, the maximum channel delay is assumed to be smaller than the CP. This is the fundamental assumption made to ensure the OFDM system works properly. For instance, in STiMi systems, the CP length is 512 samples and is ⅛ of one OFDM symbol length (4096). Accordingly, in any given channel environment, the CIR is assuming less than 512 samples in any channel environment. Conventional OFDM systems also utilize channel estimation, where most OFDM system designs use pilots for channel estimation. The pilots are interleaved with data sub-carriers within one OFDM symbol. The channel parameters of data sub-carriers are assumed to be the same as the adjacent pilots sub-carriers. Finally, manipulations (such as interpolation) is also used to achieve better estimation accuracy in practice. Existing literature utilizes these properties for channel estimation, frequency offset estimation, etc.

In exemplary embodiments of the present disclosure is provided a low complexity fine timing synchronization method and system for STiMi. The fine timing synchronization method and system reduces inverse FFT calculations while providing a fine timing synchronization position for accurately receiving OFDM symbols in an OFDM receiver. Based on the assumption that the maximum channel power delay is less than the cyclic prefix, downsampling the signal reduces the number of sub-carriers without any significant loss in performance. In one exemplary embodiment according to the present invention, there is provided a method of fine timing synchronization of a signal generated by a coarse timing synchronization unit, the coarse timing synchronization unit having generated the signal by performing an FFT and a carrier frequency offset on an OFDM signal, the OFDM signal comprising a transmission identification, synchronization symbols and at least one OFDM symbol, wherein the resulting signal includes a synchronization sequence and a CFR, wherein the method removes the synchronization sequence of the signal to obtain the CFR, the synchronization sequence having been generated by performing the FFT on the synchronization symbols of the OFDM signal, calculates a correlation coefficient of the correlation between the CFR applied to a number of carriers and the CFR applied to the number of carriers with different window shifts, the largest window shift corresponding to a downsampling factor indicated by the lowest correlation coefficient greater than a threshold, downsamples the CFR by the downsampling factor, performs an inverse FFT on the downsampled CFR with a reduced number of calculations reduced by the downsampling factor, wherein the downsampled CFR is transformed into a CIR in the time domain, and determines a fine timing synchronization position from the CIR, the fine timing synchronization position configured to provide an accurate channel power delay profile to determine window size and position of an FFT unit within an OFDM receiver, and provides the fine timing synchronization position to the FFT unit within the OFDM receiver to accurately receive the at least one OFDM symbol of the OFDM signal.

The synchronization sequence of the signal may be removed by a one-tap equalizer.

The threshold may be 0.8.

Alternatively, the threshold may be 0.9.

The downsampling factor may be at least 2.

The method may further receive the at least one OFDM symbol at the OFDM receiver, and perform an FFT on the at least one OFDM symbol with the FFT unit, the FFT unit configured to utilize the fine timing synchronization position to accurately receive the at least one OFDM symbol.

In another aspect according to an exemplary embodiment of the present invention, there is provided a fine timing synchronization system for synchronizing an FFT unit of an OFDM receiver to accurately receive an OFDM signal, the OFDM signal comprising a transmission identification, synchronization symbols and at least one OFDM symbol, that includes an equalizer having an input for receiving a signal and an output, the signal comprising a channel frequency response and a synchronization sequence having been generated by an FFT operation of a coarse timing synchronization unit, wherein the equalizer removes the synchronization sequence from the signal to obtain the CFR, a correlation estimator coupled to the output of the equalizer for a correlation coefficient of the correlation between the CFR applied to a number of carriers and the CFR applied to the number of carriers with different window shifts, the largest window shift corresponding to a downsampling factor indicated by the lowest correlation coefficient greater than a threshold, a downsampler coupled to the output of the correlation estimator for obtaining the downsampling factor and coupled to the output of the equalizer for downsampling the CFR by the downsampling factor, an inverse FFT unit coupled to the output of the downsampler for performing an inverse fast Fourier transform on the downsampled CFR with a reduced number of calculations reduced by the downsampling factor, wherein the downsampled CFR is transformed into a CIR in the time domain, and a fine timing synchronization position unit coupled to the output of the inverse FFT unit for determining a fine timing synchronization position from the CIR, the fine timing synchronization position unit configured to provide an accurate channel power delay profile to determine window size and position of the FFT unit within the OFDM receiver, wherein the fine timing synchronization position is provided to the FFT unit within the OFDM receiver to accurately receive the at least one OFDM symbol of the OFDM signal.

The equalizer may be a one-tap equalizer.

The threshold may be 0.8.

The threshold may be 0.9.

The downsampling factor may be at least 2.

The fine timing synchronization system may receive the at least one OFDM symbol, and the FFT unit within the OFDM receiver may perform an FFT on the at least one OFDM symbol, the FFT unit configured to utilize the fine timing synchronization position to accurately receive the at least one OFDM symbol.

Figure 1:
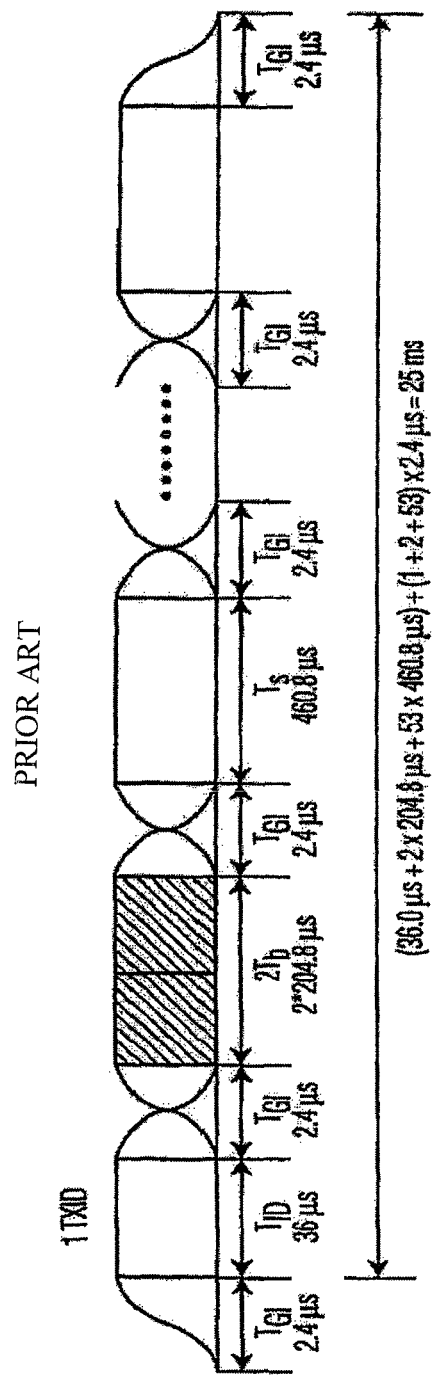
FIG. 1 is an illustration of the time slot structure of STiMi (8 MHz mode).

In the following detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive.

In exemplary embodiments according to the present invention, a low complexity fine timing synchronization method and system for STiMi is presented. The fine timing synchronization method and system reduces IFFT calculations while providing a fine timing synchronization position for accurately receiving OFDM symbols in an OFDM receiver. Based on the assumption that the maximum channel power delay is less than the cyclic prefix, downsampling the signal reduces the number of sub-carriers without any loss in performance.

As FFT and IFFT are reverse operations, a time domain signal may be represented with Channel Frequency Response (CFR) $\hat{H}(k)$ and a spectrum $\hat{H}(K)$ as the Channel Impulse Response (CIR) h(t). When it is assumed that the maximum number of taps of h(t) is L and the number of samples of $\hat{H}(k)$ is N, the bandwidth of $\hat{H}(k)$ is L. $\hat{H}_D(k)$ is a down-sampled signal of $\hat{H}(k)$ by a factor D:

$$\hat{H}_D(k) = \hat{H}(k) \cdot \sum_{m=0}^{N/D} \delta(k - mD).$$

According to the Nyquist sampling theorem, if the signal bandwidth is smaller than sampling rate, the signal is recoverable without aliasing. So if L<N/D, the down-sampled signal $\hat{H}_D(k)$ has the same spectrum as $\hat{H}(k)$. In another words, if the maximum number of CIR taps L is known, a small size IFFT may be used to recover h(t). For instance, in STiMi systems, the CP length is 512 samples. This means that the maximum number of CIR taps is less than 512 samples. As the synchronization symbols are 2048 samples, the down-sample ratio is at least 4.

Furthermore, the CP length is the worst case scenario. In many channel scenarios, the maximum number of CIR taps is much smaller than the CP length. For instance, in the typical DTV test channel: TU6 and CT8, the maximum number of CIR taps are 50 and 380 samples, respectively, for STiMi systems. Accordingly, it is possible to use a higher down-sample rate to reduce the computational complexity. However, the maximum channel length (delay) is not known by the receiver. A correlation estimator solves this problem. M carriers are selected for estimation, $\hat{H}_M(m)=\hat{H}(m)$ where $M_1<m<M_1+M$, where $M_1$ is any non-null sub-carriers index. The correlation coefficient of the correlation between $\hat{H}_M(m)$ and $\hat{H}_M(m+D)$ is calculated, where $D=2^d$, $d \in [1, 2, 3, 4, \ldots, M]$, $$R(D) = \frac{\left| \sum_{m=M_1}^{M_1+M} \hat{H}_M(m) \cdot \hat{H}_M^*(m + D) \right|}{\left| \sum_{m=M_1}^{M_1+M} \hat{H}_M(m) \cdot \hat{H}_M^*(m) \right|}$$

In other words, the correlation coefficient of the correlation between the CFR applied to a number of carriers (e.g., carrier index $C_1:C_M$) and the CFR applied to the carriers with different window shifts d (e.g., carrier index $C_{1+d}: C_{M+d}$). Once R(D) is calculated, the correlation coefficient is compared with a threshold $R_{thr}$ to decide whether the further downsample ratio is needed. R(D) is a number between 0 and 1, so the threshold $R_{thr}$ may be set to 0.8 or 0.9. $R_{thr}$ is a system parameter that depends on the requirements of the system design. The estimation process is as follows:

```
For d = 1 to M
    calculate R(D);
    if R(D) > R_thr : d=d+1, continue;
    else: choose current D, break;
end
```

Prior to the IFFT operation, the CFR correlation is estimated, which indicates the number of CIR taps in the time domain. Based on the estimation results, the down-sample rate D is determined. The down-sampled signal only needs an N/D point IFFT. Due to a smaller IFFT size, the channel power delay profile will be estimated within a small range. The smaller IFFT size reduces the computational complexity further. However, the new estimation results should be adjusted due to different IFFT size. The relation between the two profiles is:

$$\left\{ \hat{H}(k) = H(k) e^{j2\pi \frac{Dk}{N_{SYN}} \tau_s} \right\} \xrightarrow{IFFT} \left\{ h(t) * \delta(t - \tau_s T_{sam} D) \right\}$$

Figure 3:
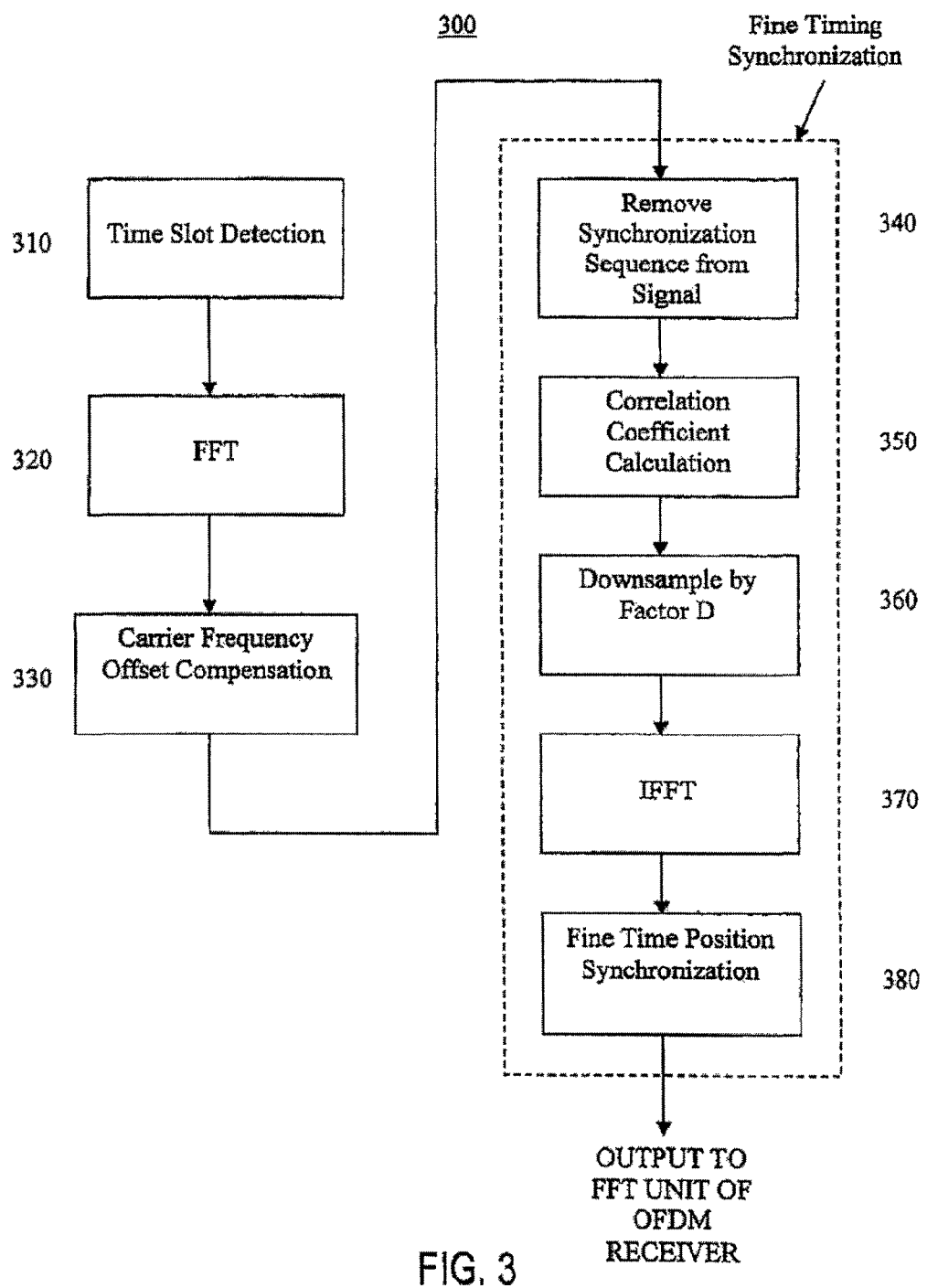
FIG. 3 is a flow diagram of a low complexity fine timing synchronization method in accordance with an embodiment of the present invention.

FIG. 3 is a diagram illustrating a fine time synchronization method 300 in accordance with an embodiment of the present disclosure.

Figure 2:
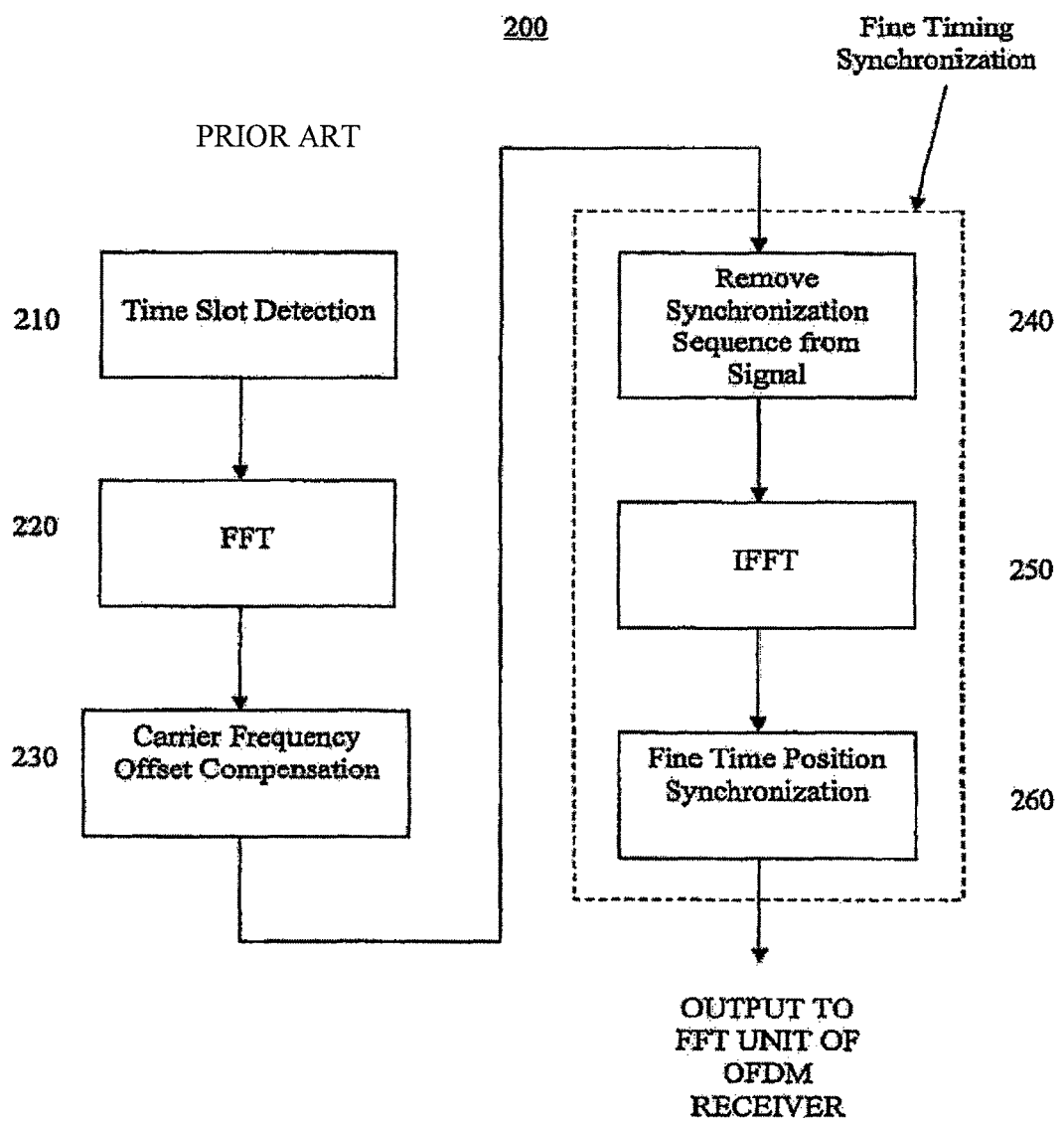
FIG. 2 is a flow diagram of a conventional STiMi acquisition signal flow.

Blocks 310-330 perform at least the same steps as the steps described at blocks 210-230 of FIG. 2. Performing coarse timing synchronization results in a signal comprising a channel frequency response (CFR) H(k), a synchronization sequence S(k) denoting the synchronization symbols of the OFDM signal, $$e^{j2\pi \frac{k}{N_{SYN}} \tau_s}$$

linear phase and noise n(k). The signal is input to the fine timing synchronization module, at block 340.

At block 340, the synchronization sequence S(k) of the signal is removed to obtain the CFR. A one-tap equalizer may be used to remove the synchronization sequence. As noted in reference to blocks 210-230 of FIG. 2, the synchronization sequence is generated by performing the FFT operation on the synchronization symbols of the OFDM signal.

At block 350, a correlation coefficient of a correlation between the CFR applied to a number of carriers and the CFR applied to the number of carriers with different window shifts is calculated. The largest window shift corresponding to a downsampling factor is indicated by the lowest correlation coefficient greater than a threshold. Accordingly, the downsampling factor is D, where $D=2^d$, $d \in [1, 2, 3, 4, \ldots, M]$ for the equation $$R(D) = \frac{\left| \sum_{m=M_1}^{M_1+M} \hat{H}_M(m) \cdot \hat{H}_M^*(m + D) \right|}{\left| \sum_{m=M_1}^{M_1+M} \hat{H}_M(m) \cdot \hat{H}_M^*(m) \right|}$$

At block 360, the CFR is downsampled by the downsampling factor. Downsampling the CFR reduces the number of sub-carriers, based on the assumption that the sub-carriers within the coherent channel bandwidth is nearly equal. The coherent channel bandwidth is a measure of the range of frequencies over which the channel can be considered "flat." In other words, a channel that passes all spectral components with approximately equal gain and linear phase. The channel coherent bandwidth can be approximately represented by the inverse of the maximum channel delay 1/TMAX. Accordingly, downsampling the signal reduces the number of sub-carriers without any loss in performance when the sample rate after downsampling is larger than the channel coherent bandwidth.

At block 370, an IFFT is performed on the downsampled signal. The IFFT is performed with a reduced number of calculations, reduced by the downsampling factor. Accordingly, the IFFT is performed as an N/D point IFFT. The downsampled CFR is transformed into a CIR in the time domain by the IFFT.

At block 380, a fine timing synchronization position is determined from the CIR. The fine timing synchronization position is configured to provide an accurate channel power delay profile to determine window size and position of an FFT unit within an OFDM receiver. The fine timing synchronization position is provided to the FFT unit within the OFDM receiver. The fine timing synchronization position ensures that the OFDM symbols of the OFDM signal are accurately received by the OFDM receiver.

Figure 4:
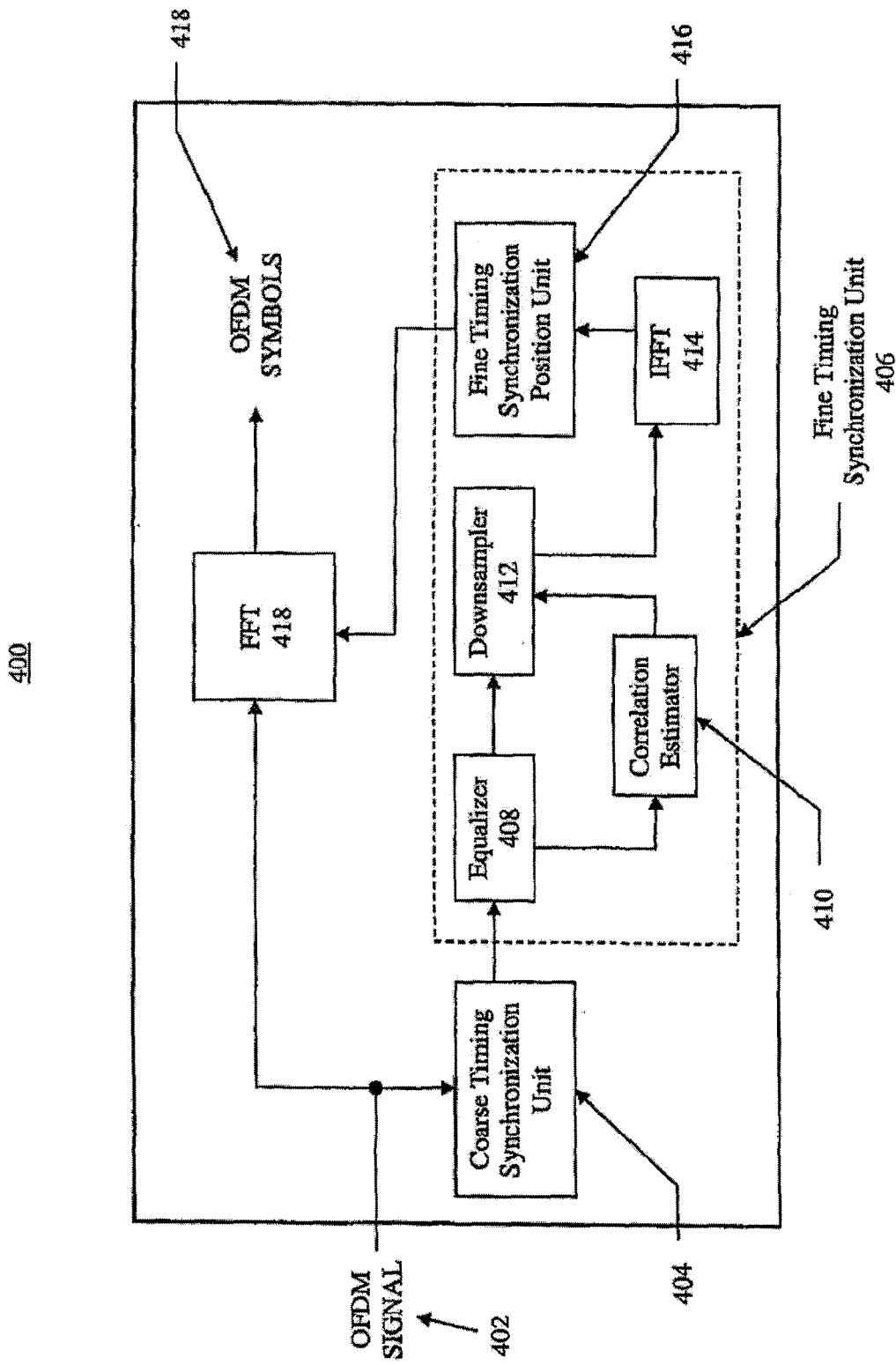
FIG. 4 is a system block diagram of a fine timing synchronization system in accordance with an embodiment of the present invention.

FIG. 4 is a block diagram of a fine timing synchronization unit in accordance with an embodiment of the present disclosure.

FIG. 4 shows an OFDM receiver 400. An OFDM signal 402 is input to the OFDM receiver 400. The OFDM signal 402 is input to a coarse timing synchronization unit 404. The coarse timing synchronization unit 404 performs at least the steps illustrated in blocks 210-230 and 310-330 in the flow diagrams of FIGS. 2 and 3.

The OFDM receiver comprises a fine timing synchronization unit 406, which in turn comprises an equalizer 408, a correlation estimator 410, a downsampler 412, an IFFT unit 414 and a fine timing synchronization position unit 416. The equalizer 408 receives the output signal from the coarse timing synchronization unit 404. The equalizer 408 removes the synchronization sequence from the output signal to obtain the CFR of the output signal. The correlation estimator 410 provides a downsampling factor to the downsampler 412. The correlation estimator 410 determines the downsampling factor by calculating a correlation coefficient of the correlation between the CFR applied to a number of sub-carriers and the CFR applied to a reduced number of sub-carriers, reduced by the downsampling factor. The downsampling factor is indicated by the lowest correlation coefficient greater than a threshold. The threshold is a system parameter determined by the system designer.

The downsampled signal and the downsampling factor is input to the IFFT unit 414 for performing an IFFT. Alternatively, only the downsampled signal is input to the IFFT unit 414. The IFFT unit 414 performs an IFFT to obtain the CIR in the time domain. The IFFT performs a reduced number of calculations, reduced by the downsampling factor. Since the downsampling factor was determined by calculating the lowest correlation coefficient greater than the threshold, the IFFT unit 414 provides the CIR without reduced performance. The CIR is input into the fine timing synchronization position unit 416 to determine the fine timing synchronization position. The fine timing synchronization position is output to the FFT unit 418, providing window size and position for the FFT unit 418. Accordingly, utilizing the fine timing synchronization position ensures that the OFDM receiver accurately receives OFDM symbols 420 from the OFDM signal 402.

Other embodiments of the present invention may be applied to a conventional OFDM system that uses two identical synchronization symbols as a preamble, or to pilot-based channel estimation in OFDM systems.

As will be understood by those of skill in the art, the present invention may be embodied in other specific forms without departing from the essential characteristics thereof. For example, while some embodiments of the low complexity fine timing synchronization method and system for STiMi are depicted using a generic receiver system, the method and system may be adapted to other receiver embodiments or embodiments using other combinations of receivers and additional hardware therein.

Accordingly, the foregoing description is intended to be illustrative, but not limiting, of the scope of the invention which is set forth in the following claims and their equivalents.

What is claimed is:

1. A method of fine timing synchronization of a signal generated by a coarse timing synchronization unit, the coarse timing synchronization unit having generated the signal by performing a fast Fourier transform (FFT) and a carrier frequency offset on an orthogonal frequency division multiplexing (OFDM) signal, the OFDM signal comprising a transmission identification, synchronization symbols and at least one OFDM symbol, wherein the resulting signal includes a synchronization sequence and a channel frequency response (CFR), comprising:

removing the synchronization sequence of the signal to obtain the CFR, the synchronization sequence having been generated by performing the FFT on the synchronization symbols of the OFDM signal;

calculating a correlation coefficient of the correlation between the CFR applied to a number of carriers and the CFR applied to the number of carriers with different window shifts, the largest window shift corresponding to a downsampling factor indicated by the lowest correlation coefficient greater than a threshold;

downsampling the CFR by the downsampling factor;

performing an inverse FFT on the downsampled CFR with a reduced number of calculations reduced by the downsampling factor, wherein the downsampled CFR is transformed into a channel impulse response (CIR) in the time domain; and determining a fine timing synchronization position from the CIR, the fine timing synchronization position configured to provide an accurate channel power delay profile to determine window size and position of an FFT unit within an OFDM receiver, and providing the fine timing synchronization position to the FFT unit within the OFDM receiver to accurately receive the at least one OFDM symbol of the OFDM signal.

2. The method of claim 1, wherein said removing the synchronization sequence of the signal is performed by a one-tap equalizer.

3. The method of claim 1, wherein the threshold is 0.8.

4. The method of claim 1, wherein the threshold is 0.9.

5. The method of claim 1, wherein the downsampling factor is at least 2.

6. The method of claim 1, further comprising:

receiving the at least one OFDM symbol at the OFDM receiver; and performing an FFT on the at least one OFDM symbol with the FFT unit, the FFT unit configured to utilize the fine timing synchronization position to accurately receive the at least one OFDM symbol.

7. A fine timing synchronization system for synchronizing a fast Fourier transform (FFT) unit of an orthogonal frequency division multiplexing (OFDM) receiver to accurately receive an OFDM signal, the OFDM signal comprising a transmission identification, synchronization symbols and at least one OFDM symbol, the system comprising:

an equalizer having an input for receiving a signal and an output, the signal comprising a channel frequency response and a synchronization sequence having been generated by an FFT operation of a coarse timing synchronization unit, wherein the equalizer is configured to remove the synchronization sequence from the signal to obtain the CFR;

a correlation estimator coupled to the output of the equalizer for calculating a correlation coefficient of the correlation between the CFR applied to a number of carriers and the CFR applied to the number of carriers with different window shifts, the largest window shift corresponding to a downsampling factor indicated by the lowest correlation coefficient greater than a threshold;

a downsampler coupled to the output of the correlation estimator for obtaining the downsampling factor and coupled to the output of the equalizer for downsampling the CFR by the downsampling factor;

an inverse FFT unit coupled to the output of the downsampler for performing an inverse fast Fourier transform on the downsampled CFR with a reduced number of calculations reduced by the downsampling factor, wherein the downsampled CFR is transformed into a channel impulse response (CIR) in the time domain; and a fine timing synchronization position unit coupled to the output of the inverse FFT unit for determining a fine timing synchronization position from the CIR, the fine timing synchronization position unit configured to provide an accurate channel power delay profile to determine window size and position of the FFT unit within the OFDM receiver, wherein the fine timing synchronization position is provided to the FFT unit within the OFDM receiver to accurately receive the at least one OFDM symbol of the OFDM signal.

8. The fine timing synchronization system of claim 7, wherein the equalizer comprises a one-tap equalizer.

9. The fine timing synchronization system of claim 7, wherein the threshold is 0.8.

10. The fine timing synchronization system of claim 7, wherein the threshold is 0.9.

11. The fine timing synchronization system of claim 7, wherein the downsampling factor is at least 2.

12. The fine timing synchronization system of claim 7, wherein the OFDM receiver is configured to receive the at least one OFDM symbol; and the FFT unit within the OFDM receiver is configured to perform an FFT on the at least one OFDM symbol, the FFT unit configured to utilize the fine timing synchronization position to accurately receive the at least one OFDM symbol.

* * * * *